United States Patent [19]

Hedrick et al.

[11] E Re. 28,492

[45] Reissued July 29, 1975

[54] DAMPER UNIT FOR CONTROLLING AIR FLOW

[75] Inventors: Warren R. Hedrick; Henry J. Meurer, both of Holland, Mich.

[73] Assignee: Allied Thermal Corporation, New Britain, Conn.

[22] Filed: July 12, 1973

[21] Appl. No.: 378,394

Related U.S. Patent Documents

Reissue of:

[64] Patent No.: 3,592,240
Issued: July 13, 1971
Appl. No.: 771,835
Filed: Oct. 30, 1968

[52] U.S. Cl. ..... 137/316; 98/41 R; 137/601; 251/212; 251/292

[51] Int. Cl.[2] ..... F16K 1/18

[58] Field of Search ..... 137/316, 601; 251/291, 251/292, 212; 98/41 R, 85, 106, 111–113

[56] References Cited

UNITED STATES PATENTS

| | | | |
|---|---|---|---|
| 7,713 | 10/1850 | Woodside | 98/113 X |
| 1,659,880 | 2/1928 | Kauffman | 98/41 R |
| 2,837,991 | 6/1958 | DeRoo | 98/41 R X |
| 3,147,768 | 9/1964 | Kennedy | 137/614.11 |

*Primary Examiner*—Robert G. Nilson
*Attorney, Agent, or Firm*—Johnson, Dienner, Emrich & Wagner

[57] ABSTRACT

A damper unit for controlling air flow by adjustment of a pair of pivotally mounted damper blades. Adjustment of the blades is accomplished by linear movement of an operating member pivotally connected to the blades and actuated by the rotation of a worm. The worm has a non-circular opening therethrough to receive a rod of similar cross section. The rod is frictionally, but movably, held in the opening through the worm for adjustment lengthwise thereof to accommodate louvered face plates of various heights.

9 Claims, 10 Drawing Figures

2 Sheets-Sheet 1

INVENTORS:
WARREN R. HEDRICK
HENRY J. MEURER
BY: Marzall, Johnston, Cooks & Root
ATT'YS

INVENTORS:
WARREN R. HEDRICK
HENRY J. MEURER

BY: Marzall, Johnston, Cook & Root
ATT'YS

DAMPER UNIT FOR CONTROLLING AIR FLOW

Matter enclosed in heavy brackets [ ] appears in the original patent but forms no part of this reissue specification; matter printed in italics indicates the additions made by reissue.

BRIEF SUMMARY OF THE INVENTION

The invention relates generally to a damper unit for controlling the flow of air into a room or other closure through an opening either in the wall or in the ceiling thereof. More particularly the invention relates to control means which are utilized to move damper blades to allow more or less air to pass through the unit into a room whereby a heating or air conditioning system may be properly balanced.

The invention is utilized in connection with that class of damper units commonly known or referred to as a "butterfly damper." In this type of structure there are normally two damper blades which may be moved toward each other in a pivotal action to open the damper or rotated away from each other to a closed position. Several problems have presented themselves in the past when units of this general type were installed in a given heating or air conditioning system. Damper units of this type are generally provided with a frame member on which the damper blades are rotatably mounted. This frame is mounted in the wall or ceiling of a room and is then covered by a louvered face plate. Such face plates vary in design. For example, some of them present a relatively flat surface and other present a rather frustoconical surface within which the louvers are positioned.

Up to the present time there have been provided various types of adjusting means so that the person installing the unit may adjust the blades to a predetermined relative position so that the proper amount of air may pass through the unit and may be balanced with the remainder of the air system. It is usually necessary for the person installing the unit to use a tool for adjusting the damper blades. The balancing of the air system is usually done after the face plate is in place. Thus, as will be noted hereinafter, when a flat face plate is used, the tool may be shorter than is necessary when the conical louvered face plate is used.

This also presents a problem for those who may wish to modify or change the setting of the damper blades at some later time. In other words, an adjusting tool which is relatively short may not be able to reach the adjusting mechanism where there is a conical louvered face plate. Thus, heretofore it has been necessary to provide such adjusting tools of different lengths. The present invention, however, enables one length of such adjusting tool to be used for all installations.

As will be noted hereinafter, certain of the parts which heretofore have been formed of metal are now proposed to be formed of a suitable plastic material, such as nylon or Teflon, whereby corrosion is prevented in the operating parts of the adjusting mechanism.

In view of the foregoing, it is one of the principle objects of the present invention to provide a damper unit which is extremely simple in construction wherein certain of the parts thereof are formed of a corrosion-resistant material, such as a plastic.

Another object of the invention is to provide an adjusting mechanism in a damper unit wherein the operating tool or handle may be frictionally held by the adjusting mechanism and yet be adjustable with respect thereto, whereby only a single length of operating handle is needed regardless of the type of louvered face which is applied thereto.

A further object of the invention is to provide an adjusting mechanism for a damper unit wherein opposed damper blades are mounted for rotative or pivotal movement about substantially the edges thereof which are adjacent each other and wherein linear movement of an operating member causes the blades to rotate towards each other for opening, or away from each other for closing.

Still another and specific object of the invention is to provide an adjusting device for adjusting the dampers of an air control unit wherein a worm is mounted in a plane perpendicular to the plane of the damper blades when they are closed, together with an operating member connected to the damper blades and engaging the worm whereby rotation of the worm will move the operating member in a direction to open or close the blades simultaneously.

A still further and specific object of the invention is to provide a damper blade adjusting mechanism wherein a worm is rotatably mounted and is adapted to be rotated to move the blades for adjustment purposes and wherein said worm has a noncircular opening therethrough adapted to receive an operating tool having a similar cross-sectional configuration whereby the tool may be inserted into the opening of the worm, thereby to rotate the worm by hand and adjust the position of the damper blades.

Other objects and advantages of the invention will become apparent upon reading the following description taken in conjunction with the accompanying drawings, in which.

DETAILED DESCRIPTION

Figure 1:
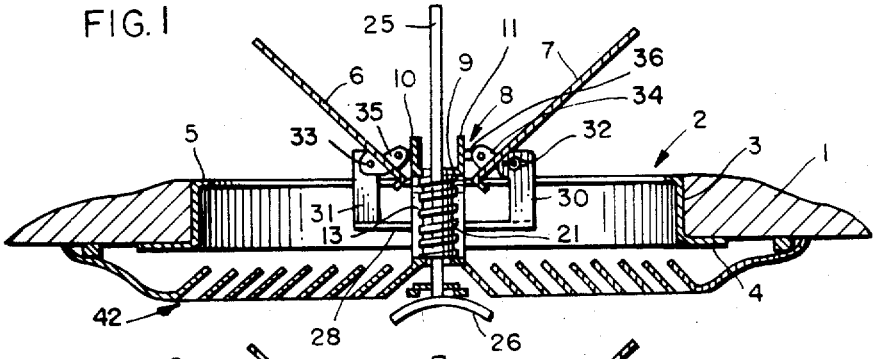
FIG. 1 is a transverse vertical sectional view through a damper unit embodying the present invention illustrating a flat louvered face plate mounted with respect thereto.
Figure 2:
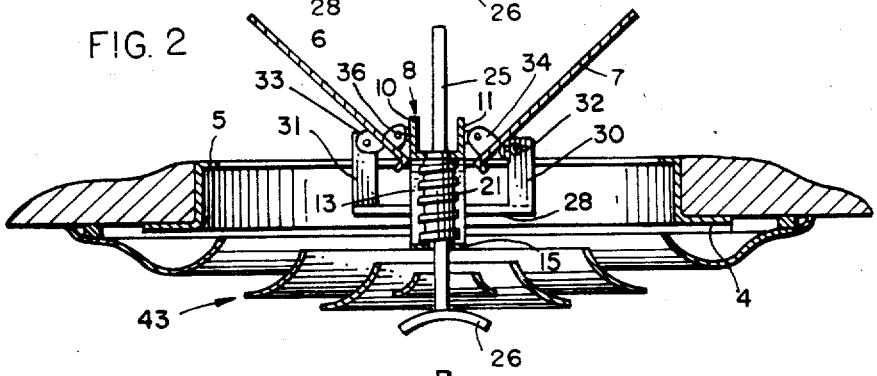
FIG. 2 is a view similar to FIG. 1 but illustrating the unit in association with a conical louvered face plate.

Referring now more particularly to the drawings and especially to FIGS. 1 and 2 thereof, the wall or ceiling in which the damper unit of the present invention is to be mounted is indicated by the numeral 1. The damper unit itself is generally indicated by the numeral 2 and comprises a frame member 3 of any desired configuration, but in the present instance is shown as being circular. This frame member 3 at the bottom edge thereof is provided with an out-turned flange 4 which is adapted to bear against the surface of the wall or ceiling in which the unit is mounted. The ceiling is provided with an opening of the same configuration as the frame 3, whereby the unit is adapted to fit into the opening in the ceiling. A suitable air conduit (not shown) is connected to the damper unit and extends from a furnace or other type of air conditioning system.

The upper edge of the frame member 3 is provided with an annular inturned flange member 5 and within this framework the unit is open. The opening in the frame is adapted to be closed by a pair of damper blades 6 and 7 together with a support member generally indicated by the numeral 8.

Figure 7:
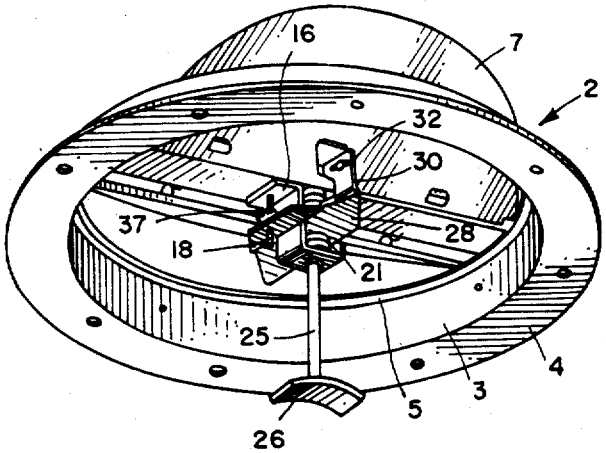
FIG. 7 is a perspective view of the assembled damper unit viewed from the underside thereof.
Figure 6:
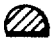
FIG. 6 is a transverse sectional view illustrating a preferred cross-sectional configuration of the operating tool or handle member, and is taken substantially along the plane of line 6—6 of FIG. 5.
Figure 10:
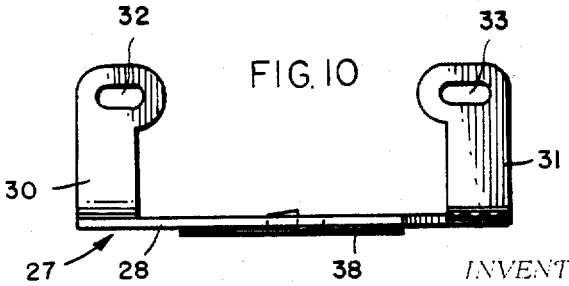
FIG. 10 is a side elevational view of the operating member and is taken substantially along the plane of line 10—10 of FIG. 9 looking in the direction of the arrows.

This support member is preferably in the form of a channel provided with a base member 9 and upstanding side flanges 10 and 11. As may be seen more clearly in FIGS. 3 and 7, this support member 8 extends across the opening of the frame 3 and is secured at each end thereof to the inturned annular flange 5 by means such as welding or otherwise.

Figure 5:
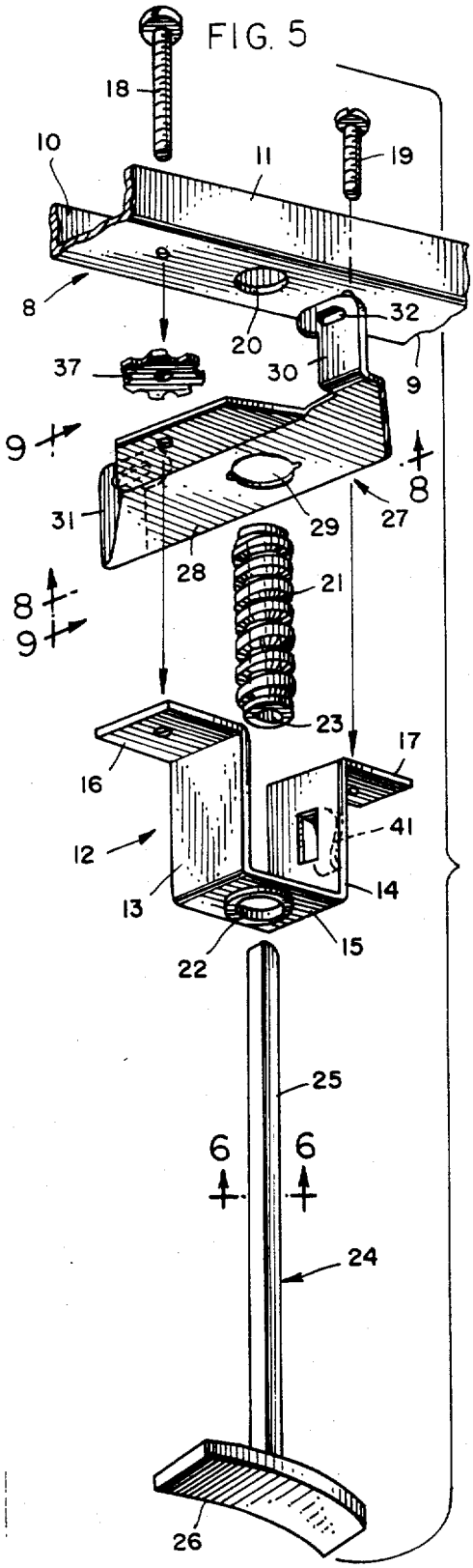
FIG. 5 is an exploded perspective view illustrating the various elements which constitute the adjusting mechanism of the present invention.
Figure 8:
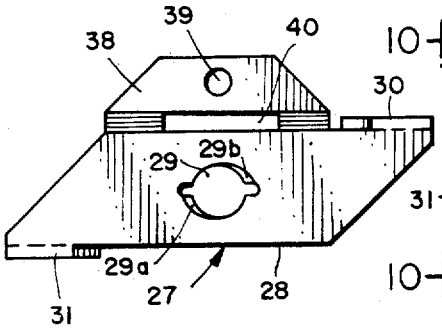
FIG. 8 is an under plan view of the operating member which imparts movement to the damper blades when the worm is rotated.
Figure 9:
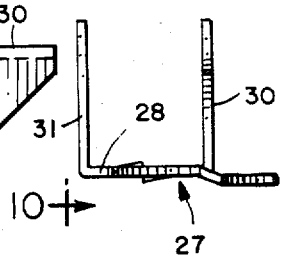
FIG. 9 is an end elevational view of said operating member and is taken substantially along the plane of line 9—9 of FIG. 5 looking to the direction of the arrows.

A substantially U-shaped bracket member, generally indicated by the numeral 12 (FIG. 5), is mounted on the underside of the channel-shaped support member 8 preferably at substantially the mid point between the ends thereof. This bracket consists of spaced side members 13 and 14, connecting member 15, and out-turned flanges 16 and 17 adapted to bear upwardly against the base 9 of the support member. Screw members 18 and 19 pass downwardly through the support member 8 and through the flanges 16 and 17 of the bracket, whereby the bracket may be secured to said support.

The base member 9 of the support 8 is provided with an opening 20 therethrough and preferably at substantially the mid point thereof for the purpose of rotatably mounting one end of a worm member 21. The lower connecting member 15 of the bracket 12 is also provided with an opening 22 therein which is adapted to rotatably mount the opposite end of the worm 21. Thus, in their assembled relation when the bracket 12 is mounted to the underside of the support 8, the worm 21 will be supported in these two members so that it may be rotated by a suitable operating tool as will be pointed out hereinafter.

The worm 21 is provided throughout the length thereof with a noncircular bore 23. An operating tool generally indicated by the numeral 24, is provided with a noncircular elongated shaft 25 having at one end thereof the handle portion 26. This elongated shaft 25 of the operating tool is adapted to be received by the bore 23 in the worm 21 so that rotation of the operating tool will rotate the worm for operating the damper members as will presently be seen.

As mentioned hereinabove, the worm 21 is preferably formed of a corrosion-resistant material, such as a plastic, and the operating tool 24 is also preferably formed out of a similar material. One reason for this is so that there may be provided a snug frictional fit between the stem or shaft 25 of the tool and the bore 23 of the worm, whereby insertion of the operating tool within the worm may be made easily and yet be retained in any position to which it may be moved.

The operating member which is provided for the purpose of operating the damper blades at the time the worm is being rotated is generally indicated by the numeral 27. The preferred construction of this operating member is illustrated more clearly in FIGS. 5 through 10 of the drawings. This member is composed essentially of a flat plate having a main body portion 28. There is an opening 29 in the member which is circular and is adapted to receive the worm 21. Opposed edges of this opening 29 are offset with respect to each other, as at 29a and 29b in order that they may be engaged by the threads on the worm 21, whereby the member 27 will move lengthwise of the worm when it is rotated.

At one end of the operating member and at one side thereof there is provided an upwardly extending ear 30 adapted to be secured to one of the damper blades. At the opposite end of the member 27, as well as at the opposite side thereof, there is a second and similarly constructed ear member 31 which also extends upwardly therefrom and is adapted to be secured to the other damper blade.

The upper end of each of the ears 30 and 31 is enlarged so that each may be provided with elongated slots 32 and 33. These slots may be seen more clearly in FIGS. 1, 2, 4, 5, and 10.

Near the center of each of the damper blades 6 and 7 and adjacent the inner edge of each there is an ear which is stamped out of the blade and which extends inwardly or downwardly away therefrom. Each of these ears is secured to the operating member 27. The ear which is connected to the upper end of the ear 30 on the operating member 27 is not visible in the drawings. However, it is identical with the ear indicated by the numeral 33 in FIGS. 1, 2 and 4, which is shown as being pivotally connected to the ear 31 extending upwardly from the plate 28 of the operating member 27.

Figure 4:
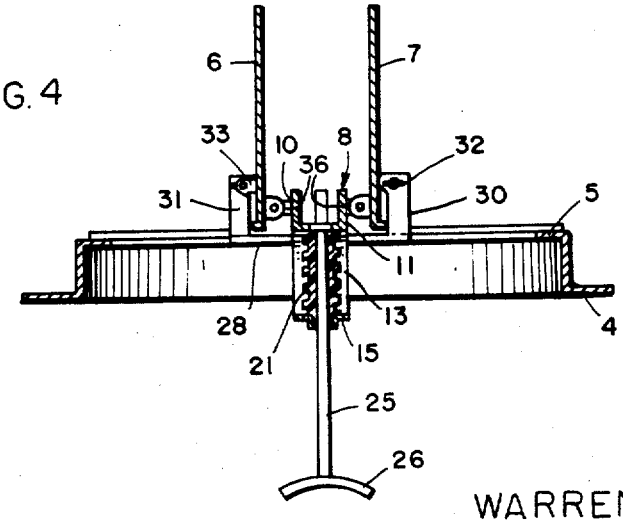
FIG. 4 is a view similar to FIG. 3 taken at 90° therefrom but showing the damper blades adjusted to a position where the unit is open and the damper blades are parallel.

Extending upwardly from each of the damper blades 6 and 7 there is a pair of ears which have openings therein adapted to receive a pivot member which is stamped out of the adjacent side of the transverse support member 8, thereby to render each of the damper blades rotatable. In FIGS. 1, 2 and 4 there are two of these ears 34 extending outwardly from the inner edge of the damper blade 7 and there is a like pair of ears 35 extending upwardly in a comparable position on the damper blade 6. A plurality of pivot members in the form of hooks, such as that shown in FIG. 1 by the numeral 36, extend outwardly in opposed directions from each of the upwardly extending sides 11 and 10, respectively, of the transverse support member 8. These pivot or hook members, such as that shown at 36, extend outwardly from the transverse support and are bent so as to be received by openings in the ears 34 and 35. Thus, it will be seen that as the operating member 27 moves upwardly and downwardly by rotation of the worm 21, it will cause the damper blades 6 and 7 to be rotated about the pivots and cause these blades to open when the operating member moves upwardly, and to close when the operating member moves downwardly.

As indicated above, when the unit is being installed and the heating or air conditioning system is being balanced, the blades 6 and 7 will be moved to a predetermined open position and will preferably remain in that position so that the system will be maintained in balance at all times. In order that the blades may not be inadvertently opened farther than they should be, a stop arrangement is provided to prevent further opening movement of the blades once they have been set. This is accomplished by means of a rotatable stop member 37 (see FIGS. 3, 5 and 7) which stop member has a threaded opening therethrough and is adapted to receive the threaded member 18. The operating member 27 has a second relatively flat plate portion 38 which is offset downwardly from and is connected along one edge of the main body portion 28. This offset plate portion is provided with an opening 39 through which the threaded member 18 may extend freely, as well as a slot 40, through which one side 13 of the bracket 12 is adapted to extend. When these parts are assembled, the threaded member 18 has the function of securing the one side of the bracket 12 to the underside of the transverse support member 8 and at the same time will receive the threaded stop member 37 and will pass freely through the opening 39 of the operating member. The screw 19 will secure the opposite side of the bracket 12 to the underside of the transverse support 8.

Figure 3:
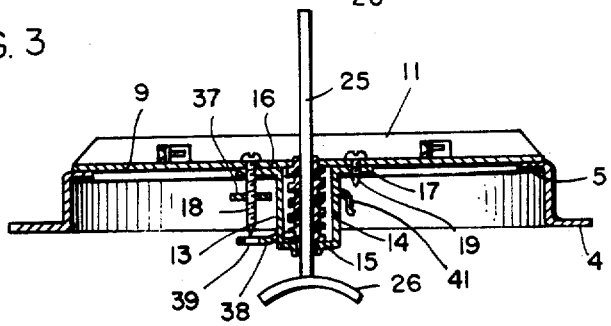
FIG. 3 is a vertical transverse sectional view through the damper unit of the present invention showing the damper blades in closed position.

As will be evident, and as will also be observed from viewing FIG. 3, the stop member 37 may be adjusted to any desired position along the length of the screw member 18, and when it is in the position such as that shown in FIG. 3 and the operating tool 25 is rotated to rotate the worm, then the operating member 27 will be caused to move upwardly, but it may not move beyond the point where the offset part 38 abuts against the stop member 37. It will be evident that the reason why this portion of the operating member is offset is to accommodate the stop member 37 when the damper blades are in their fully open position.

An added feature of the invention is the provision of means whereby the operating tool 25 together with its integral handle 26 may be stored with the unit when it is being shipped. For this purpose a small clamping member 41 is stamped out of one of the sides of the bracket 12 and may be more clearly shown in FIGS. 3 and 5. The space between this clamp 41 and the wall 14 of the bracket from which it is stamped is such that it will snugly receive the shaft 25 of the tool 24, whereby the tool will lie lengthwise across the bracket and in a position which is transverse to the support member 8.

This has the advantage that when the unit is shipped, the person installing the unit will have the proper tool at his finger tips and available immediately so that he may insert the shaft 25 thereof into the opening of the worm 21 and promptly move the damper blades to their proper position merely by rotating the tool and worm.

As mentioned earlier in this description, this arrangement of the operating tool and the worm permits the same tool to be utilized regardless of the louvered face that is being used with the unit. For example, in FIG. 1 the flat louvered face is indicated generally by the numeral 42, while in FIG. 2 the conical louvered face is indicated generally by the numeral 43. Obviously, a shorter tool may be used when adjusting the damper blades where there is a flat louvered face than is necessary when the conical face is used. With the arrangement described herein, however, and particularly when the worm and the operating tool are formed of a noncorrosive plastic material, the tool may be inserted within the opening in the worm and will remain merely by friction at any point along the length thereof to which it has been moved. For example, as shown in FIG. 1 the tool, even though it is longer than necessary, may be inserted into the worm and moved upwardly so that only the handle 26 is exposed and none of the shaft may be seen. Likewise, when a longer tool is normally required, such as in the case of the conical louvered face 43, the tool will not be inserted as far into the worm as in FIG. 1 and yet the tool may remain in position merely by friction so that the blades may be closed at will merely by rotating the operating tool.

FIG. 4 illustrates the operating tool when it is extended outwardly and is in an intermediate position as it is being inserted through the worm.

It is thus evident that there are many advantages which will accrue from the design as described and disclosed herein. The noncorrosive feature will permit the parts to be operated over long periods of time and without any appreciable wear. Furthermore, there is no longer any need for operating tools with shafts of varying lengths depending upon the type of louvered face plate that is to be used in connection with the unit. Heretofore it has been necessary for the installer to utilize a longer tool for the conical face and a shorter tool for the flat face, and he could not leave the tools inserted for future adjustment. Furthermore, the operating tools were not shipped with the unit because it was not known in advance as to the type of louvered face plate which was going to be used in connection therewith.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention we claim is as follows:

1. In a damper unit for regulating air flow and having a frame member with an opening therethrough for the passage of air, a support extending transversely of the frame member and secured thereto, a pair of opposed damper blades mounted for generally pivotal movement about the adjacent edges thereof upwardly toward each other to open position and downwardly away from each other to closed position, the improvement which comprises a. a substantially U-shaped bracket mounted on the underside of said support, b. a worm extending downwardly from said support and mounted for rotation at the upper end thereof in said support and at the lower end thereof in said bracket, c. an operating member below said blades and engaging at least one of the teeth on said worm and adapted to move axially thereof when said worm is rotated, and d. means connecting said damper blades with said operating member and with said support, whereby rotation of said worm will cause said operating member to move axially of said worm, thereby to move said damper blades toward or away from each other.

2. A damper unit as defined in claim 1, wherein said worm is formed of a corrosion resistant plastic material and has a noncircular opening extending axially thereof, an elongated rod having a cross-sectional configuration similar to that of said noncircular opening, and a clip on said bracket, said rod being adapted to be securely held in place by said clip while the damper unit is in storage or being shipped and to be removed therefrom and then frictionally held in the noncircular opening of said worm during installation of the unit, whereby rotation of said rod will rotate said worm to move said damper blades.

3. In a damper unit for regulating air flow and having a frame member with an opening therethrough for the passage of air, a support extending transversely of the frame member and secured thereto, a pair of opposed damper blades mounted for generally pivotal movement about the adjacent edges thereof upwardly toward each other to open position and downwardly away from each other to closed position, the improvement which comprises:

a. a worm rotatably mounted on the support and extending downwardly therefrom, b. an operating member below said blades and engaging at least one of the teeth on said worm and adapted to move axially thereof when said worm is rotated, c. means connecting said damper blades with said operating member and with the support, whereby rotation of said worm will cause said operating member to move axially of said worm, thereby to move said damper blades toward or away from each other, and d. a noncircular opening extending axially through the entire length of said worm for the reception of an elongated rod having a cross-sectional configuration similar to that of said noncircular opening, whereby rotation of the rod will rotate said worm to move said damper blades, and the rod may be moved upwardly through said opening for storage purposes.

4. In a damper unit for regulating air flow and having a frame member with an opening therethrough for the passage of air, a support extending transversely of the frame member and secured thereto, a pair of opposed damper blades mounted for generally pivotal movement about the adjacent edges thereof upwardly toward each other to open position and downwardly away from each other to closed position, the improvement which comprises:

a. a worm rotatably mounted on the support and extending downwardly therefrom, b. an operating member below said blades and engaging at least one of the teeth on said worm and adapted to move axially thereof when said worm is rotated, c. means connecting said damper blades with said operating member and with the support, whereby rotation of said worm will cause said operating member to move axially of said worm, thereby to move said damper blades toward or away from each other, and d. an elongated member extending from said support member toward said operating member, a stop member adjustable to selected positions along the length of said elongated member in the path of movement of said operating member, thereby to limit movement of said operating member in one direction, and movement of said damper blades toward each other.

5. In a damper unit for regulating air flow and having a frame member with an opening therethrough for the passage of air, a support extending transversely of the frame member and secured thereto, a pair of opposed damper blades mounted for generally pivotal movement about the adjacent edges thereof upwardly toward each other to open position and downwardly away from each other to closed position, the improvement which comprises:

a. a worm rotatably mounted on the support and extending downwardly therefrom, b. an operating member including a relatively flat strip extending transversely of said support below said blades, and engaging at least one of the teeth on said worm and adapted to move axially thereof when said worm is rotated, c. means including two arms, one on each side of said support [and] rigidly secured [thereto] *to and* extending from said strip upwardly toward said damper blades, for connecting said damper blades with said operating member [and with the support, whereby rotation of said worm will cause said operating member to move axially of said worm, thereby to move said damper blades toward or away from each other] , and d. pivot means connecting each said [worm] *arm* with one of said damper blades [.] , *whereby rotation of said worm will cause said operating member to move axially of said worm, thereby to move said damper blades toward or away from each other.*

6. A damper unit as defined in claim 5, wherein each said pivot means includes a pin and slot connection.

7. In a damper unit for regulating air flow and having a frame member with an opening therethrough for the passage of air, a support extending transversely of the frame member and secured thereto, a pair of opposed damper blades mounted for generally pivotal movement about the adjacent edges thereof toward each other to open position and away from each other to closed position, the improvement which comprises a. a worm formed of a corrosion resistant plastic material mounted on the support and extending therefrom in a direction away from the direction in which the blades move toward open position, b. an operating member engaging at least one of the teeth on said worm and movable axially thereof when said worm is rotated, c. means connecting said damper blades with said operating member and with the support, whereby rotation of said worm will cause said operating member to move axially of said worm, thereby to move said damper blades toward or away from each other, d. a noncircular opening extending axially through said worm, and e. a rod having a cross-sectional configuration similar to that of said noncircular opening and received therein, whereby rotation of said rod will rotate said worm and operate said damper blades, said rod being frictionally held in said worm, but movable to selected positions axially thereof, whereby it is adapted to be used with various heights of louvered faces mounted on said frame member.

8. A damper unit as defined in claim 7 wherein said rod is also formed of a corrosion resistant plastic material.

9. In a damper unit for regulating air flow and having a frame member with an opening therethrough for the passage of air, a support extending transversely of the frame member and secured thereto, a pair of opposed damper blades mounted for generally pivotal movement about the adjacent edges thereof upwardly toward each other to open position and downwardly away from each other to closed position, the improvement which comprises:

a. a worm rotatably mounted on the support and extending downwardly therefrom, b. an operating member below said blades and engaging at least one of the teeth on said worm and adapted to move axially thereof when said worm is rotated, c. means connecting said damper blades with said operating member and with the support, whereby rotation of said worm will cause said operating member to move axially of said worm, thereby to move said damper blades toward or away from each other, and d. the means connecting said damper blades with the support including a pair of ears extending outwardly from each said blade adjacent the support, an opening through each of said ears, and a pair of pin members extending outwardly from opposite sides of the support, each pin extending through the opening in the ear adjacent thereto.

* * * * *